Patented Feb. 24, 1931

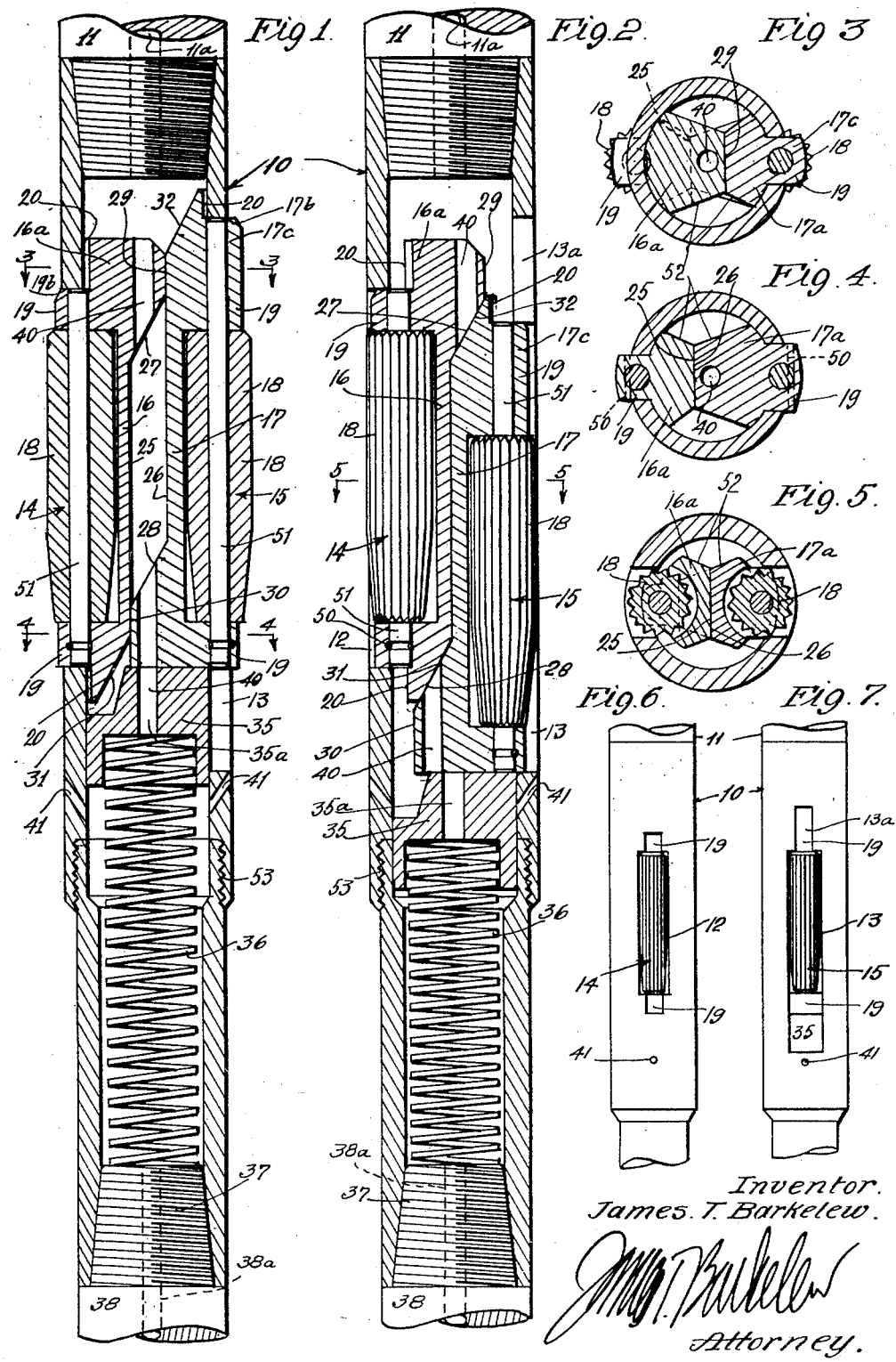

1,793,988

UNITED STATES PATENT OFFICE

JAMES T. BARKELEW, OF PASADENA, CALIFORNIA, ASSIGNOR TO JOHN GRANT, OF LOS ANGELES, CALIFORNIA

EXPANSIVE ROTARY UNDERREAMER

Application filed November 19, 1929. Serial No. 408,259.

This invention has to do with expansive reaming tools such as underreamers of the type used in rotary drilling operations; and a general object of the invention is the provision of an extremely simple form of expansive underreamer, or expansive reamer, having a minimum number of parts and of extreme solidity of design.

The present invention utilizes the slotted tubular body such as is shown in the Brown Patent No. 1,454,843, issued May 15, 1923 and in several subsequent patents, such for instance as that to John T. Phipps, No. 1,678,073, issued July 24, 1928. Expansive underreamers or reamers of the type shown in those patents utilize an interior abutment mandrel or core against which the cutters or cutter blocks bear inwardly for support and along which the cutters or cutter blocks ride in relative longitudinal-vertical-movement in order to be given their expanding and contracting movements.

The present invention, among other things, eliminates a central abutment mandrel or core and substitutes an arrangement whereby the cutters or cutter blocks bear inwardly directly against each other. The parts of the cutters or cutter blocks which are interior of the slotted tubular body are so formed that, by relative longitudinal movement between the respective cutters, contraction and expansion is obtained. This relative longitudinal movement is obtained in the specific design herein described by making one of the cutters longitudinally movable in the supporting body, while the other opposite cutter (speaking of an underreamer which, in this particular illustrative embodiment, has but two cutters) remains longitudinally stationary in the body.

The cutters or cutter blocks are so designed, as to their parts interior of the slotted tubular body, that, when the cutters are expanded, these parts substantially completely fill the interior cross-section of the tubular body; thus, in effect, making a body and cutter assembly which is solid and therefore presents maximum resistance to inwardly directed forces. And this same design strongly supports the cutters against being torn out by tangential forces. Thus the invention achieves the solidity and rigidness of design previously reached, but with fewer parts.

A better understanding of the invention will be had from the following detailed description of an illustrative embodiment, reference for this purpose being had to the accompanying drawings, in which:

Figure 1 is a vertical longitudinal section showing the tool in its expanded condition;

Fig. 2 is a similar view showing the tool contracted;

Figs. 3 and 4 are cross-sections, respectively, on lines 3—3 and 4—4 of Fig. 1;

Fig. 5 is a cross-section on line 5—5 of Fig. 2;

Fig. 6 is a reduced side elevation showing one side of the tool; and

Fig. 7 is a similar elevation showing the opposite side of the tool.

In the drawings a typical tubular slotted body is shown at 10 adapted at its upper end for connection with a sub 11 for connection with the drill pipe, and provided with cutter slots 12 and 13. In the present showing a reamer of two cutters only is illustrated, and so, correspondingly, there are but two cutter slots through the body wall. One of these cutter slots, 12, is preferably just long enough to accommodate the relatively stationary cutter element 14; while the other cutter slot, 13, is longer, so as to allow its cutter element 15 a limited vertical movement with relation to cutter element 14.

Cutter elements 14 and 15 may be designed and constructed in any form desired and with any suitable form of ultimate cutting edge or cutter proper. In the form here shown, these cutter elements are made up of cutter blocks 16 and 17, each of which carries a roller cutter 18 on a substantially vertical axis, the rollers providing the ultimate cutting edges. However, as far as the present invention is concerned, the ultimate cutting edges or cutters proper can be formed or designed in any suitable manner. It is not to this feature that the present invention is directed; it is rather to the inter-relation and cooperation of the inner or rear parts of the cutter elements (in this particular case the cutter blocks) with each other and with the body.

Each of the cutter blocks 16 and 17 has, within the tubular body, an enlarged part which bears outwardly against the body wall when the cutters are expanded (see Figs. 3 and 4) and which preferably is substantially semi-cylindric in form. These enlarged parts are designated generally by the numerals 16a and 17a in cross-sectional views. These inner enlarged parts not only extend laterally beyond the extent of those parts (the cutter carrying lugs 19) which extend through the body slots, but they may also preferably extend above and below the cutter carrying lugs 19 so as to provide outwardly facing shoulders 20 at the upper and lower ends of the cutter blocks, which shoulders also may bear outwardly against the body wall for additional solidity. Such upwardly and outwardly extending shoulders may, however, be omitted, as the lateral extent of the inner block parts 16a and 17a may be ample and sufficient for outward bearing. In any case, such shoulder is shown as omitted at the lower end of the cutter block 17 (the right hand cutter block in the drawings) for the reason that when this cutter is up and expanded, the cutter slot 13 extends below the lower end of the cutter element, and a downwardly extending and outwardly bearing shoulder would not at that point bear outwardly against the solid, unslotted, portion of the body wall.

The inner parts 16a and 17a of the respective cutter blocks meet each other on vertical planes which are so formed as to give relative expansive movements to the two cutter elements when the cutter element 15 moves upwardly. In order to obtain such expansive movement by a relatively short vertical movement, and also to obtain solid bearing of the cutter blocks on each other when expanded and to so support the cutters that cutter element 15 cannot be forced downwardly by inwardly directed pressure however large, and further in order to provide that the outward pressure of the cutter elements against the casing when collapsed shall not be too great, these vertical planes of interaction between the two cutter blocks are stepped horizontally in the manner illustrated. Thus the cutter block 16 has a vertical rear surface 25 which extends from its lower end upwardly to a point near its upper end where the cutter block 16 has an inward projection or expanding lug defined by the diagonal expanding surface 27 and the vertical bearing surface 29, which surface 29 is situated inwardly of the plane of the bearing surface 25. Correspondingly, cutter block 17 has a vertical bearing surface 26 which extends from its upper end down to a point near the lower end of that cutter block, at which point the cutter block 17 has an expanding lug which is defined by the diagonal expanding surface 28 and the offset vertical bearing surface 30. In the expanded position of the cutter elements, the lower vertical offset bearing face 30 of cutter block 17 bears upon the lower part of the vertical bearing surface 25 of cutter block 16; while the upper vertical offset bearing face 29 of cutter block 16 bears upon the upper part of bearing face 26 of cutter block 17. Thus in this expanded position the two bearing faces 25 and 26 of cutter blocks 16 and 17, respectively, are spaced apart a short distance, the distance of their spacing representing the amount of diametral expansion of the tool.

When the cutter element 15 is moved downwardly its lower expanding lug, defined by the faces 28 and 30, moves below the lower end of bearing face 25 of block 16, so that the expanding face 28 of block 17 drops in under the lower end of block 16 and is then preferably in contact with a diagonal expanding face 31 at the lower end of block 16. See Fig. 2. At the same time, the upper end of block 17 has moved down and thus can move inwardly to where its upper end drops in under the diagonal expanding face 27 of block 16, and diagonal expanding face 32 of block 17 then preferably bearing against the diagonal face 27. In this relative position of the cutter blocks, the two vertical bearing faces 25 and 26 are in contact, or substantially so. All this will be readily understood from a comparison of Figs. 1 and 2.

A cutter propeller in the form of a plunger 35 is located within the body below the lower end of cutter block 17 and presses upwardly against that cutter block. Cutter actuating spring 36 is confined in the body below the propeller 35. This compression spring may be compressed and supported at its lower end on pin 37 of the tool joint at the upper end of the drill bit 38 which is usually attached to the lower end of expansive reamers or underreamers. The spring action is constantly to press the plunger 35 upwardly, therefore constantly tending to elevate the cutter element 15. When the tool is not within a casing, and the cutters are free to expand, the spring moves cutter block 17 up from the position of Fig. 2 to the position of Fig. 1. In so moving upwardly the pairs of diagonal expanding faces 28, 31 and 27, 32 react upon each other as rather abrupt wedge faces, causing the cutter elements to move outwardly to the relative expanded position shown in Fig. 1. Then, after outward expansive movement, the vertical faces 26 and 30 of cutter block 17 ride directly upwardly on the vertical bearing faces 25 and 29, respectively, of cutter block 16, so that in the final expanded position the cutters are solidly supported against inward pressures. At the same time that the cutters and their cutter blocks reach the expanded position of Fig. 1, their inner enlarged parts 16a and 17a also bear outwardly against the inner wall surface of the body; so that the cutters are then solidly supported in all directions. In fact, in this expanded condition, the inner enlarged parts 16a and 17a of the cutter blocks substantially fill the entire interior of the tubular body.

It will be noted from the drawings that the cutter slot 13 which accommodates cutter 15 is longer than cutter slot 12. Cutter slot 12 is of such length as preferably to hold cutter 14 substantially longitudinally immovable; while cutter slot 13 is long enough to allow the longitudinal movement hereinbefore described of cutter 15, even though cutter 15, is, in effect, longer in a vertical direction than is cutter 14. This extra length can best be seen in Fig. 1 where it will be noted that the cutter block 17 of cutter 15 extends upwardly higher than does cutter block 16 of cutter 14. This upward extension, to which the numeral 17c is applied, is, as designed in this specific illustration, an upward extension of the upper ear 19 which supports the upper end of the roller 18. When the cutter 15 is in this uppermost or expanded position, this extension 17c fills or occupies the upper part 13a of the cutter slot 13, which upper slot part 13a may be, but not necessarily so, narrower than the main part 13 of the slot. The upper end of block extension 17c provides a casing engaging shoulder 17b which, in the position of Fig. 1, stands at an elevation above the corresponding shoulder 19b of cutter block 16; the difference in elevation being substantially equal to the vertical distance by which cutter 15 must be moved down to reach the collapsed position of Fig. 2. In other words, when the tool is drawn up into the casing, the lower end of the casing or casing shoe strikes the elevated shoulder 17b and thus causes the cutter 15 to be pushed down, relatively, to or substantially to the position of Fig. 1, before the casing shoe strikes the shoulder 19b of cutter 14. Thus, the cutter 15 is pushed down to collapsing position before cutter 14 is struck by the casing, the cutters then being in collapsing position, inward pressure of the casing on the upper end of cutter block 16, simultaneously with inward casing pressure on the upper end of cutter block 17, causes the cutters to collapse to the position of Fig. 2.

The necessary water courses may be carried through the tool by providing grooves or channels 40 in the cutter bearing surfaces 29 and 30 to carry the circulating fluid past and through the bearing lugs which are defined by those surfaces. Thus the circulating fluid is transmitted from the circulating passage 11a in sub 11 down to a point in the body below the cutters. Then the plunger 35 may be provided with a fluid course 35a to carry the fluid to that part of the body below the plunger whence the fluid may enter the circulating course 38a of the body. The plunger 35 may be so formed and of such length as to close the otherwise open lower end of cutter slot 13 when cutter 15 is up. Also when the cutter and plunger are up, circulation holes 41 through the body wall may be uncovered to direct circulating fluid to points under the cutters.

In the specific design herein shown, and in order to assemble and disassemble the parts, the lower part of the body is separable at the screw-threaded joint 53 from the upper part of the tubular body. Thus, when the cutters are contracted, and after the spring and plunger have been withdrawn from the body, the roller carrying pins 51 may be removed by driving them downwardly into the then open lower interior of the body, after the cross pins 50 have been removed. These operations may be performed when the cutters are in the collapsed or loose position of Figure 2 and the cutters are shoved first to the right in that figure and then to the left, in order to drive out the two roller pins 51. Then, by moving the cutters, for instance, to the right, as far as they will go, the left-hand cutter may be removed by moving it directly upwardly through the interior of the tubular body. In order to facilitate this upward passage of each cutter through the tubular body, in the particular design and proportions shown in the drawings, the cutter blocks are somewhat beveled at their sides as is indicated at 52 in Figure 3.

It has not been attempted, in the drawings and description, to set out all the various particulars of design and features of detail which may be adopted for reamers of different diameters, amounts of expansion, or different cutting edges for various types of work, etc. All such may be designed as best may suit particular circumstances. The invention is not intended to be limited to any such details, nor to the details which for purposes of illustration are here shown and described; but only limited as stated in the following claims.

I claim:

1. In an expansive reaming tool, the combination of a tubular slotted body, cutter elements mounted in the body slots for outward and inward movements of expansion and contraction, one of the cutter elements being movable longitudinally with reference to the other, the cutter elements being in contact with each other within the body, and the surfaces of contact being formed so that the cutters are moved outwardly by virtue of relative longitudinal movement of the movable cutter in one direction.

2. In an expansive reaming tool, the combination of a tubular slotted body, cutter elements mounted in the body slots for outward and inward movements of expansion and contraction, one of the cutter elements being longitudinally immovable in its body slot and the other being longitudinally movable in its slot, the two cutter elements being in contact with each other within the body, and the surfaces of contact being formed so that the cutters are moved outwardly by virtue of relative longitudinal movement of the movable cutter in one direction.

3. In an expansive reaming tool, the combination of a tubular slotted body, cutter elements mounted in the body slots for outward and inward movements of expansion and contraction, one of the cutter elements being movable longitudinally with reference to the other, the cutter elements being in contact with each other within the body, and the surfaces of contact being formed so that the cutters are moved outwardly by virtue of relative upward longitudinal movement of the movable cutter.

4. In an expansive reaming tool, the combination of a tubular slotted body, cutter elemens mounted in the body slots for outward and inward movements of expansion and contraction, one of the cutter elements being longitudinally immovable in its body slot and the other being longitudinally movable in its slot, the two cutter elements being in contact with each other within the body, and the surfaces of contact being formed so that the cutters are moved outwardly by virtue of relative upward longitudinal movement of the movable cutter.

5. In an expansive reaming tool, the combination of a tubular slotted body, cutter elements mounted in the body slots for outward and inward movements of expansion and contraction, one of the cutter elements being movable longitudinally with reference to the other, the cutter elements having laterally enlarged parts within the tubular body, which parts bear inwardly against each other and together substantially fill the body interior, the surfaces of contact of said parts being so formed that the cutters are moved outwardly by virtue of relative longitudinal movement of the movable cutter in one direction.

6. In an expansive reaming tool, the combination of a tubular slotted body, cutter elements mounted in the body slots for outward and inward movements of expansion and contraction, one of the cutter elements being longitudinally immovable in its body slot and the other being longitudinally movable in its slot, the cutter elements having laterally enlarged parts within the tubular body, which parts bear inwardly against each other and together substantially fill the body interior, the surfaces of contact of said parts being so formed that the cutters are moved outwardly by virtue of relative longitudinal movement of the movable cutter in one direction.

7. In an expansive reaming tool, the combination of a tubular slotted body, cutter elements mounted in the body slots for outward and inward movements of expansion and contraction, one of the cutter elements being movable longitudinally with reference to the other, the cutter elements having laterally enlarged parts within the tubular body, which parts bear inwardly against each other and together substantially fill the body interior, the surfaces of contact of said parts being so formed that the cutters are moved outwardly by virtue of relative upward longitudinal movement of the movable cutter.

8. In an expansive reaming tool, the combination of a tubular slotted body, cutter elements mounted in the body slots for outward and inward movements of expansion and contraction, one of the cutter elements being movable longitudinally in its body slot and the other being longitudinally movable in its slot, the cutter elements having laterally enlarged parts within the tubular body, which parts bear inwardly against each other and together substantially fill the body interior, the surfaces of contact of said parts being so formed that the cutters are moved outwardly by virtue of relative upward longitudinal movement of the movable cutter.

9. In an expansive reaming tool, the combination of a tubular slotted body, cutter elements mounted in the body slots for outward and inward movements of expansion and contraction, one of the cutter elements being movable longitudinally with reference to the other, the cutter elements being in contact with each other within the body, the surfaces of contact being formed so that the cutters are moved outwardly by virtue of relative upward longitudinal movement of the movable cutter, and means within the body tending to move said movable cutter upwardly.

10. In an expansive reaming tool, the combination of a tubular slotted body, cutter elements mounted in the body slots for outward and inward movements of expansion and contraction, one of the cutter elements being longitudinally immovable in its body slot and the other being longitudinally movable in its slot, the two cutter elements being in contact with each other within the body, the surfaces of contact being formed so that the cutters are moved outwardly by virtue of relative upward longitudinal movement of the movable cutter, and means within the body tending to move said movable cutter upwardly.

11. In an expansive reaming tool, the combination of a tubular slotted body, cutter elements mounted in the body slots for outward and inward movements of expansion and contraction, one of the cutter elements being movable longitudinally with reference to the other, the cutter elements having laterally enlarged parts within the tubular body, which parts bear inwardly against each other and together substantially fill the body interior, the surfaces of contact of said parts being so formed that the cutters are moved outwardly by virtue of relative longitudinal movement of the movable cutter in one direction, and means within the body tending to move said movable cutter upwardly.

12. In an expansive reaming tool, the combination of a tubular slotted body, cutter elements mounted in the body slots for outward and inward movements of expansion and contraction, one of the cutter elements being longitudinally immovable in its body slot and the other being longitudinally movable in its slot, the cutter elements having laterally enlarged parts within the tubular body, which parts bear inwardly against each other and together substantially fill the body interior, the surfaces of contact of said parts being so formed that the cutters are moved outwardly by virtue of relative upward longitudinal movement of the movable cutter in one direction, and means within the body tending to move said movable cutter upwardly.

13. In an expansive reaming tool, the combination of a tubular slotted body, cutter elements mounted in the body slots for outward and inward movements of expansion and contraction, the cutter elements bearing against each other within the body, one of the elements being longitudinally movable relatively to the other and their surfaces of contact being so formed that the cutters are moved outwardly by virtue of relative longitudinal movement of the movable cutter in one direction, both cutter elements having a casing engaging part, and said part of the relatively movable element being longitudinally spaced from said part of the other element so as to be engaged first by a casing into which the tool is moved.

14. In an expansive reaming tool, the combination of a tubular slotted body, cutter elements mounted in the body slots for outward and inward movements of expansion and contraction, one of the cutter elements being longitudinally immovable in its body slot and the other being longitudinally movable in its slot, the two cutter elements being in contact with each other within the body, the surfaces of contact being formed so that the cutters are moved outwardly by virtue of relative upward longitudinal movement of the movable cutter, the movable cutter element extending upwardly in its slot, when the cutters are expanded, to an elevation above the upper end of the other cutter and having at its upper end a casing engaging shoulder which is engaged by a casing before the other cutter is engaged.

15. In an expansive reaming tool, the combination of a tubular slotted body, cutter elements mounted in the body slots for outward and inward movements of expansion and contraction, one of the cutter elements being longitudinally immovable in its body slot and the other being longitudinally movable in its slot, the cutter elements having laterally enlarged parts within the tubular body, which parts bear inwardly against each other and together substantially fill the body interior, the surfaces of contact of said parts being so formed that the cutters are moved outwardly by virtue of relative upward longitudinal movement of the movable cutter in one direction, the movable cutter element extending upwardly in its slot, when the cutters are expanded, to an elevation above the upper end of the other cutter and having at its upper end a casing engaging shoulder which is engaged by a casing before the other cutter is engaged.

In witness that I claim the foregoing I have hereunto subscribed my name this 15th day of November, 1929.

JAMES T. BARKELEW.